United States Patent
Watanabe et al.

(10) Patent No.: US 7,533,009 B2
(45) Date of Patent: May 12, 2009

(54) RADIATOR HEAT-DISSIPATION SIMULATION SYSTEM

(75) Inventors: Takashi Watanabe, Saitama (JP); Masayuki Iwata, Saitama (JP); Koji Sakagami, Saitama (JP); Satoru Kiyota, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 511 days.

(21) Appl. No.: 11/017,849

(22) Filed: Dec. 22, 2004

(65) Prior Publication Data

US 2005/0171749 A1    Aug. 4, 2005

(30) Foreign Application Priority Data

Dec. 25, 2003    (JP) ............................ 2003-430855

(51) Int. Cl.
*G06G 7/48* (2006.01)
*G06G 7/56* (2006.01)

(52) U.S. Cl. .................. 703/6; 703/1; 165/41; 165/44; 236/34; 715/771

(58) Field of Classification Search ...................... 703/1, 703/7, 8; 165/11.1, 41, 44; 236/34; 715/771
See application file for complete search history.

(56) References Cited

U.S. PATENT DOCUMENTS 6,209,794 B1 *   4/2001   Webster et al. ................ 236/94
6,775,995 B1 *   8/2004   Bahel et al. ................... 62/127
7,222,058 B2 *   5/2007   Miller ........................... 703/2
2003/0097242 A1   5/2003   Strumolo et al.

FOREIGN PATENT DOCUMENTS

JP    60-7550 A    1/1985

OTHER PUBLICATIONS

Martin W. Wambsganss, "Thermal Management in Heavy Vehicles: A Review Identifying Issues and Research Requirements", 1999, US Dept of Energy, pp. 1-17.*
Wolverine Tube, Inc.; "Wolverine Engineering Data Book II"; 2001; Wolverine Tube, Inc.; ToC and pp. 59-70.*
V. Damodaran and S. Kaushik, "Simulation to Identify and Resolve Underhood/Underbody Vehicle Thermal Issues", 2000, Fluent Inc., pp. 1-4.*
Unigraphics Solutions Inc., "Solid Edge User's Guide", 1998, Unigraphics Solutions Inc., Version 6, pp. 27-98.*

(Continued)

*Primary Examiner*—Paul L Rodriguez
*Assistant Examiner*—Jason Proctor
(74) *Attorney, Agent, or Firm*—Birch, Stewart, Kolasch & Birch, LLP

(57) ABSTRACT

To enable immediate and easy-to-understand confirmation of heat-dissipation capability only by entering shape data of a radiator without switching screens. Shape data input sections and a shape display section for a radiator, and a graph display section which displays the calculated result as a graph are adapted to be displayed on the identical screen of the screen device. The pattern diagram of a radiator shape and the result of heat-dissipation capability can be seen on the graph simultaneously only by entering the shape data of the radiator without switching the screen.

18 Claims, 6 Drawing Sheets

OTHER PUBLICATIONS

I. N. Dul'kin, "Optimization of the Dimensions of a Radiator—A Flat Wall with Straight Fins having a Rectangular Profile", 1992, High Energy Institute Teplofizika Vysokikh Temperatur, vol. 30, No. 2, (translation attached, 37 pages total).*

Kuhner, et al.; "Virtual Fluids—An environment for integral visualization and analysis of CAD and simulation data," International Workshop on Vision, Modeling and Visualization. Proceedings 2000, pp. 1-8, p. 2, left column, lines 5-16.

Shepard, et al., "Toward simulation-based design", Finite Elements in Analysis and Design, Elsevier, the Netherlands, vol. 40., No. 12, Jul. 2004, pp. 1575-1598.

Eichlseder, et al., "Auslengung von Kuhlsystemen mittles Simulationsrechnung", Automobiltechnische Zeitschrift, vol. 99, No. 10, pp. 638-640 an 644-647.

* cited by examiner

RADIATOR HEAT-DISSIPATION SIMULATION SYSTEM

CROSS-REFERENCE TO RELATED APPLICATIONS

The present application is related to Japanese Patent Application No. 2003-430855 filed on Dec. 25, 2003 the entire contents of which are hereby incorporated by reference.

BACKGROUND OF THE INVENTION

1. Field of the Invention

The present invention relates to a radiator heat-dissipation simulation system using a computer for calculating heat-dissipation capability of a vehicle radiator and displaying the result on a screen of the display device.

2. Description of Background Art

When estimating a heat-dissipation capability of a vehicle radiator having a water-cooled engine mounted thereon, a composite coefficient of heat transfer of a coefficient of heat transfer from cooling water flowing in channels of cooling pipes (metal pipes) which constitute the radiator to inner walls of the metal pipes, a coefficient of heat transfer from the inner wall of the metal pipe to an outer wall of the metal pipe, and a coefficient of heat transfer from the outer wall of the metal pipe to the outside air is taken into consideration. Also, it is necessary to take the flow rate of water into consideration for the coefficient of heat transfer from water to the inner wall of the metal pipe. Furthermore, in addition to the coefficient of the heat transfer of the cooling pipes, the length of the cooling pipes, the number of stages of the cooling pipes which constitute the radiator, and further, the fact that the air velocity or the like affects the cooling capability are taken into consideration to estimate the performance of the radiator.

In other words, the heat-dissipation capability, for example, the amount of heat-dissipation is calculated as a value of a function (estimated value) by an expression using parameters of data on the shape of the radiator and the structure of the cooling pipes as variables.

Accordingly, when estimating the heat-dissipation capability of the vehicle radiator having a water-cooled engine mounted thereon in the related art, the estimated value is obtained by substituting variables in various expressions by manual calculation using a calculator, spreadsheet software, or an expanded function thereof (macro).

A technology to display the contents calculated by a super computer with regard to a simulation analysis of an electric circuit on a graphic display is proposed. However, the technology is not provide a simulation of the heat-dissipation of the vehicle radiator. See, JP-A-60-7550, FIG. 3.

As described above, when estimating the heat-dissipation capability of the vehicle radiator having the water-cooled engine mounted thereon in the related art, there is a problem in that the input operation including the input of numerical values via a keyboard and the reading of the numerical value and the result reading operation are complicated.

Also, since the shape of the radiator is processed simply by entering numerical values of the dimensional data, the shape of the radiator cannot be imaged by intuition. Therefore, there is a problem in that it is quite difficult to know the causal relation between the result of the calculation and the shape by intuition.

SUMMARY AND OBJECTS OF THE INVENTION

In view of such problems, it is an object of the present invention to provide a radiator heat-dissipation simulation system for enabling visceral comprehension of the causal relation between the shape and the heat-dissipation capability of the radiator.

A radiator heat-dissipation simulation system of the invention is a radiator heat-dissipation simulation system using a computer in which the heat-dissipation capability of a vehicle radiator is calculated and the result of calculation is displayed on a screen of a display device. The system includes a shape data input section for entering the shape data of the radiator. A shape display section is provided for displaying the geometric shape of the radiator calculated by the computer based on the entered shape data. An environmental conditions input section is provided for setting and entering the environmental conditions of the vehicle with a graph display section for calculating the heat-dissipation capability of the radiator by computer based on the entered shape data and the environmental conditions and displaying the calculated result as a graph. The shape data input section, the shape display section, the environmental condition input section, and the graph display section are displayed on the identical screen of the display device.

According to the present invention, since the shape data input section and the radiator shape display section, the vehicle environmental condition input section, and the graph display section for displaying the calculated result as a graph are displayed on the identical screen of the display device, a drawing of the radiator shape and the result of the heat-dissipation capability (characteristic) can be viewed simultaneously as a graph without switching the screen only by entering the shape data of the radiator (no complicated screen switching operation is necessary). In other words, since a change of the shape and the influence thereof (the result of the heat-dissipation capability) are displayed on the identical screen visually and immediately, the relationship between the shape and the heat-dissipation capability of the radiator can be comprehended by intuition.

When displaying the calculated result as a graph, the result of numerical values can be displayed on the graph display section (graph/value of numerical value display section) simultaneously with the graph.

In this case, by dividing the screen into left and right sides and displaying the input-system screen including the shape data input section, the shape display section, and the environmental condition input section on the identical screen of the display device together with the graph display section, comprehension of the output result is facilitated. In other words, since the screen is divided into the input system and the output system, the screen is eye-friendly.

Since the radiator shape data includes the number of stages of the cooling pipes constituting the radiator, the shape of the cross-section of the cooling pipes, and an upper side and a lower side of the radiator when the radiator contour is assumed to have a trapezoidal shape, and the vehicle environmental conditions include the air velocity and the outside air temperature corresponding to the velocity of the vehicle, the heat-dissipation capability can be estimated by changing the main data (parameters) and changing the shape.

When the radiator is necessary to be provided with a cooling fan, with a configuration in which the shape data of the cooling fan of the radiator is entered via the shape data input section, and the geometrical shape of the cooling fan is displayed on the shape display section, the relation between the shape of the radiator including the cooling fan mounted thereon and the heat-dissipating capability can be comprehended by intuition.

According to the present invention, since the radiator shape data input section, the radiator shape display section based on the shape data, and the graph display section for displaying the result of the heat-dissipation are displayed on the identical screen, the relation between the shape and the heat-dissipation capability of the radiator can be comprehended by intuition.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
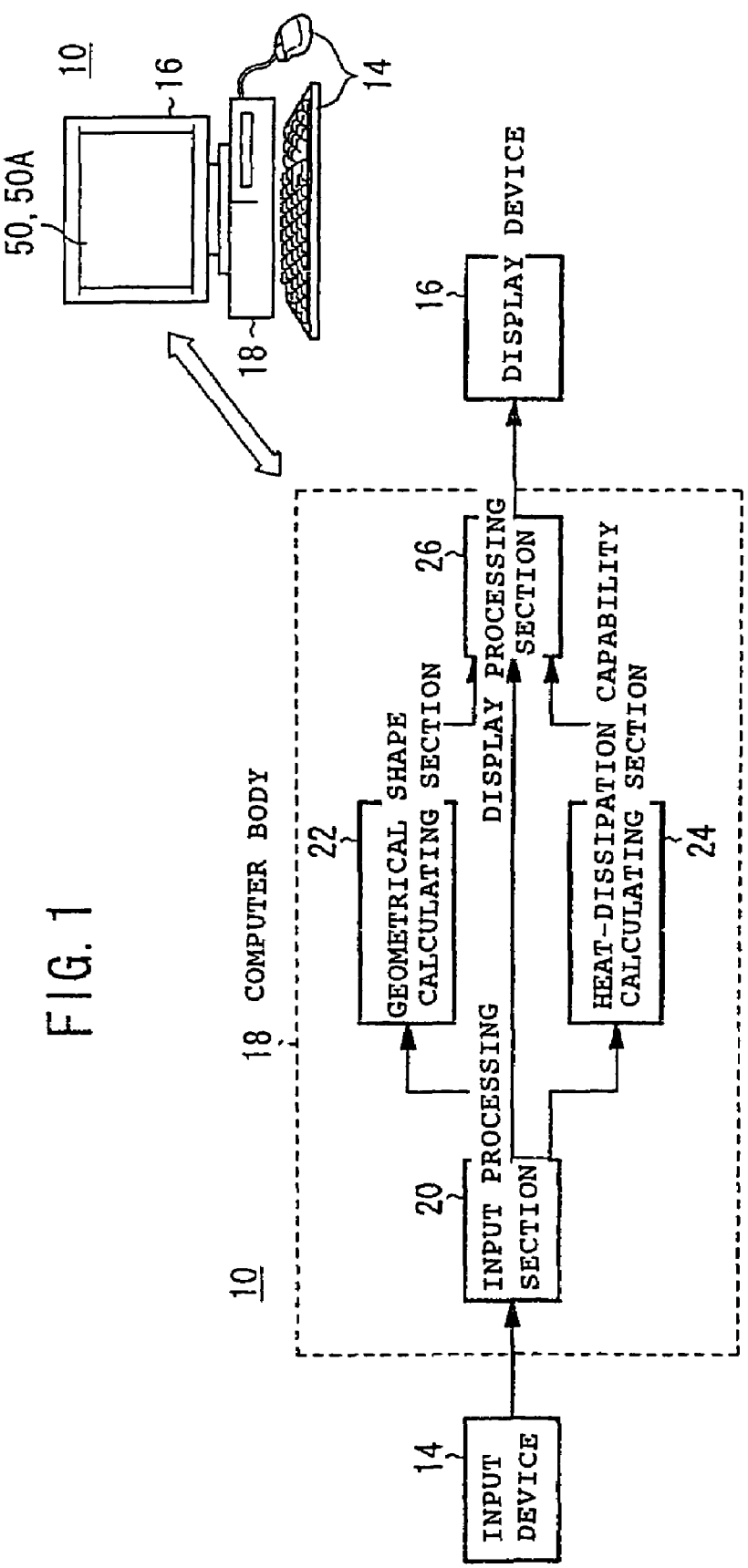
FIG. 1 is a block diagram of a radiator heat-dissipation simulation device to which the radiator heat-dissipation simulation system according to an embodiment of the invention is applied.

Referring now to the drawings, embodiments of the present invention will be described wherein FIG. 1 illustrates a structure of a radiator heat-dissipation simulation device 10 to which the radiator heat-dissipation simulation system according to an embodiment of the present invention is applied. As is understood from FIG. 1, the radiator heat-dissipation simulation device 10 is composed of a personal computer or the like, and basically includes an input device 14 including a keyboard, a mouse, etc., a display device 16 such as a CRT display device or a liquid crystal display device, and a computer body 18 which is to be connected thereto.

The computer body 18 is a calculator and includes, though not shown, a CPU (central processing unit), a ROM as a memory (EEPROM is also included), a RAM (random access memory), or HDD (hard disk drive), an I/O device, a timer as timing means and serves as a control unit, a calculating unit, and a processing unit. The ROM or the HDD includes a program to be read into the RAM and executed by the CPU when executing calculation stored therein, and the function block of the program to be executed by the CPU (computer) is shown in the block diagram in the computer body 18 shown in FIG. 1.

In other words, the computer body 18 includes an input processing unit 20 for converting the input via the input device 14 into data and outputting the same, a geometrical shape calculating unit 22 for calculating the geometrical shape of a radiator based on the input data, a heat-dissipation capability calculating unit 24 for calculating the heat-dissipation capability of the radiator based on the input data, and a display processing unit 26 for generating video signals for displaying on a screen based on input data and the result of calculation obtained by the geometrical shape calculating unit 22 and the heat-dissipation capability calculating unit 24.

Figure 2B:
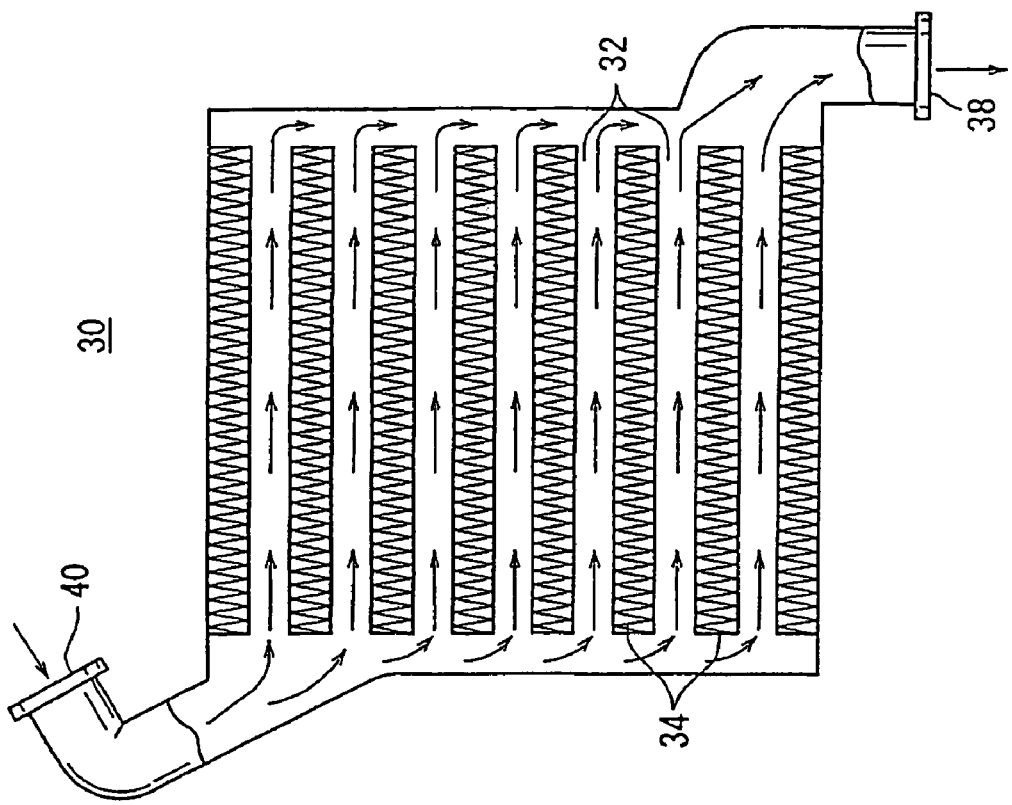
FIG. 2B is a pattern cross-sectional view of the general radiator.
Figure 2A:
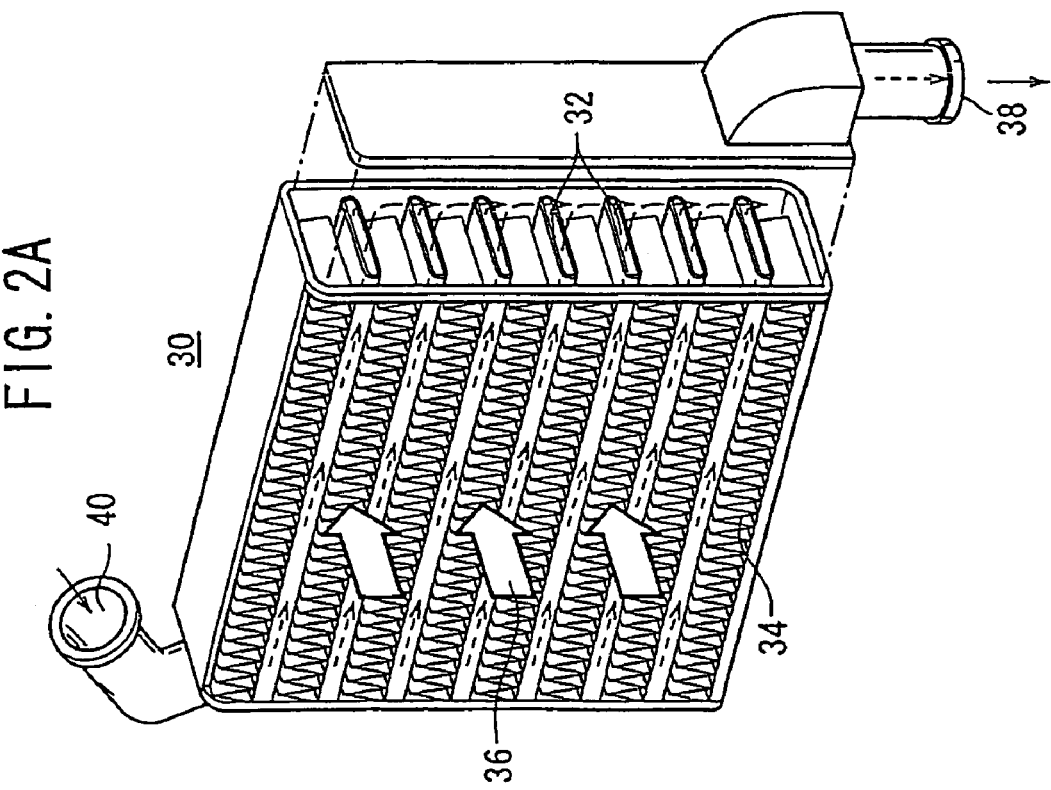
FIG. 2A is a pattern perspective view of a general radiator.

FIG. 2A and FIG. 2B show a pattern diagram of a radiator 30 to be mounted on a vehicle, for example, on a motorcycle. The radiator 30 includes a layer structure having cooling pipes 32 in which cooling water flows, and fins 34 for improving the heat-dissipation efficiency. The radiator 30 is trapezoidal shape (including square shape) when viewed from the front where flow of air 36 hits, for example. The radiator 30 is connected to a water pump, not shown. Then, water supplied from a water inlet port 40 by a water pump and flowing in the cooling pipes 32 is cooled by the outside air temperature, the flow of air 36, the cooling pipes 32, the fin 34, or the cooling fan (not shown), and is outputted from a water outlet port 38. Water outputted from the outlet port 38 flows in a jacket of an engine (not shown) through the water pump and cools the engine, and water which received heat from the engine is returned from the water inlet port 40 into the radiator 30.

The heat-dissipation calculating unit 24 shown in FIG. 1 includes an expression, wherein x represents given positions of the cooling pipes 32 in the longitudinal direction, $T(x)$ represents a water temperature, and Ta represents an outside air temperature, stored therein. The expression is a differential equation, and is represented by the following expression (1).

$$dT/dx = -(T-Ta)K/u - (T^4 - Ta^4)M/u \quad (1)$$

Here, u represents the flow rate of water, K represents a constant value which contributes to a heat transfer from water to the outer walls of the cooling pipes 32 (the wall which comes into contact with air) (determined by the shape of the cooling pipes, the composite coefficient of heat transfer, and the like), and M represents a constant value which contributes to heat radiation from the outer walls of the cooling pipes 32 (determined by the shape of the cooling pipes and Stefan-Boltzmann's constant). These constants of the differential equation are determined by various experiments.

Figure 3:
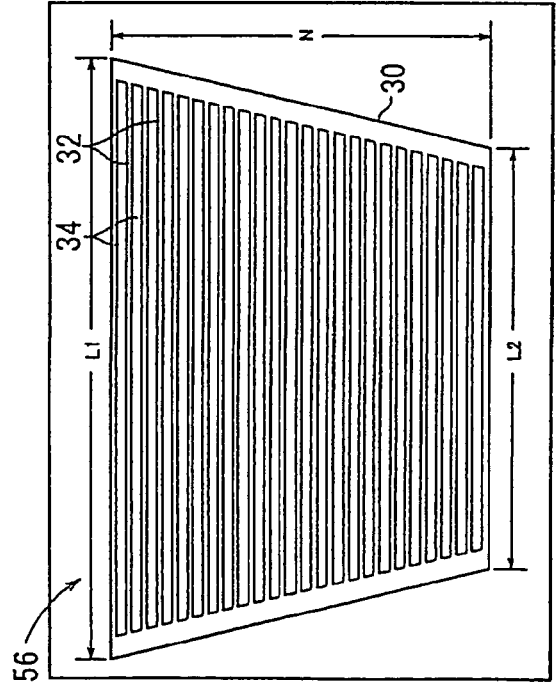
FIG. 3 is an explanatory drawing of an input system screen of a display device.

FIG. 3 shows a screen 50 of a display device 16. The screen 50 is basically constructed of a single screen including an input system screen 52 on the left half side when viewed from the front, and an output system screen 54 on the right half side when viewed from the front.

The input system screen 52 includes shape data input sections 54A, 54B for entering the shape data (parameters) of the radiator 30, which is entered via the input device 14 and is processed by the input processing unit 20, a shape display section 56 for displaying the geometrical shape of the radiator calculated by the geometrical shape calculating unit 22 based on the entered shape data, an environmental condition input section 57 for setting the environmental conditions of the vehicle, which is entered via the input device 14 and processed by the input processing unit 20 and entering the same, and a flow velocity input section 58 for setting a flow rate Um of a flow flowing in the respective cooling pipes 32 and distribution of the flow velocity and entering the same.

Although the flow velocity Um is actually illustrated by the length of the arrow in the cooling pipe 32 in the radiator 30 displayed on the shape display section 56, since it makes the illustration thereof complicated, it is omitted in FIG. 3.

The shape data input section 54A provided at the left upper corner on the screen 50 is a screen that a user input data such as a width w ("24.0", "mm" are entered as an example), a height h ("2.0", "mm" are entered as an example), and thickness t ("0.3", "mm" are entered as an example) of a cross-sectional shape of the cooling pipe 32 via the input device 14 such as a mouse, a keyboard, or the like.

The shape data input section 54B provided on the lower left side on the screen 50 is a screen including a slider 59 that allows a change in the values by pointing with the mouse pointer, clicking the left button of the mouse, and dragging the slider. The screen permits the user to enter data such as, when the contour of the radiator 30 viewed from the front has a trapezoidal shape, a length of the upper side L1 ("0.152", "m" are entered, for example), a length of the lower side L2 ("0.092", "m" are entered, for example), the number of stages N of the cooling pipes 32 ("25", "stages" are entered, for example), and reduction and enlargement ratios ("1.3", "times" are entered, for example) via the input device 14 such as the mouse.

Furthermore, the environment condition input section 57 provided likewise on the lower left side on the screen 50 is a screen including the slider 59 which allows a change in the value by pointing with the mouse pointer and clicking by the left button of the mouse, and dragging the slider 59. The screen permits the user to enter data such as an outside air temperature Ta ("10° C." is entered for example) and a air speed U corresponding to the vehicle speed ("8.0" (m/s)) corresponding to the vehicle speed 28.8 (km) is entered, for example) using the input device 14 such as the mouse.

The flow rate input section 58 provided on the upper center on the left side of the screen 50 is a screen including the slider 59 for allowing the change of the value (deviation) by pointing with the mouse pointer, clicking by the left button of the mouse, and dragging the slider 59. The screen permits the user to enter data such as the flow velocity distribution indicating that cooling water in all the cooling pipes 32 flow at a uniform flow rate, or a non-uniform flow rate which changes gradually by each cooling pipe 32 with deviation (the flow velocity is relatively higher on the upper side and lower on the lower side of the radiator 30, or vice versa) using the input device 14 such as the mouse. The basic flow rate Um can be entered via the input device 14 such as the keyboard (Um=0.96 (m/s) is entered, for example). A fin presence/absence button on the lower right on the screen (fin presence/absence input section) 60 is a screen for switching between "fin-presence" and "fin-absence" according to whether the fins are to be mounted or not, and is set to "fin-presence" as a default. Furthermore, on the lower side of the fin presence/absence input section 60 on the screen, there is provided a cooling fan presence/absence button (cooling fan presence/absence input section) 61 which is a screen for switching between the cooling fan "presence" and the cooling fan "absence" depending on whether the cooling fan is to be mounted to the radiator 30 or not.

When the width w, the height h, the thickness t, the length of the upper side L1, and the length of the lower side L2 of the shape of the cross-sectional are of the cooling pipe 32, the number of stages N of the cooling pipes 32, and the reduction and enlargement rates are supplied on the shape data input sections 54A, 54B using the input device 14, the input processing unit 20 supplies the input data to the geometrical shape calculating unit 22.

The geometrical shape calculating unit 22 calculates the shape of the radiator 30 having the shape and the number of stages corresponding to the input data based on the input data, and sends the calculated result to the display processing unit 26.

The display processing unit 26 generates video signals for displaying the radiator having the shape and the number of stages corresponding to the input data on the center of the left side of the screen 50 based on the calculating result from the geometrical shape calculating unit 22 and the various input data from the input processing unit 20, and sends the generated video signals to the display device 16.

The display device 16 displays the input system screen 52 mainly on the left side in FIG. 3 on the screen 50 based on the video signals for display.

After having finished the setting of the geometrical shape of the radiator 30 displayed on the left half and setting the display thereof on the screen, a calculation start button 62 is pressed (clicked) via the input device 14 such as the mouse. With this operation, the heat-dissipation capability calculating unit 24 references the input data described above, and the heat-dissipation capability is calculated based on the expression described above, which is stored in advance. In this embodiment, temperature lowering characteristic and heat-dissipation amount characteristic are calculated as the heat-dissipation capability. By sending the result of calculation to the display processing unit 26, a graph display section (also referred to as graph/numerical value display section or result display section) 64 is displayed including a temperature lowering characteristic display section 64A on the output-system display 54 on the right side of the display device 16 and a heat-dissipation amount characteristic display section 64B.

Figure 4:
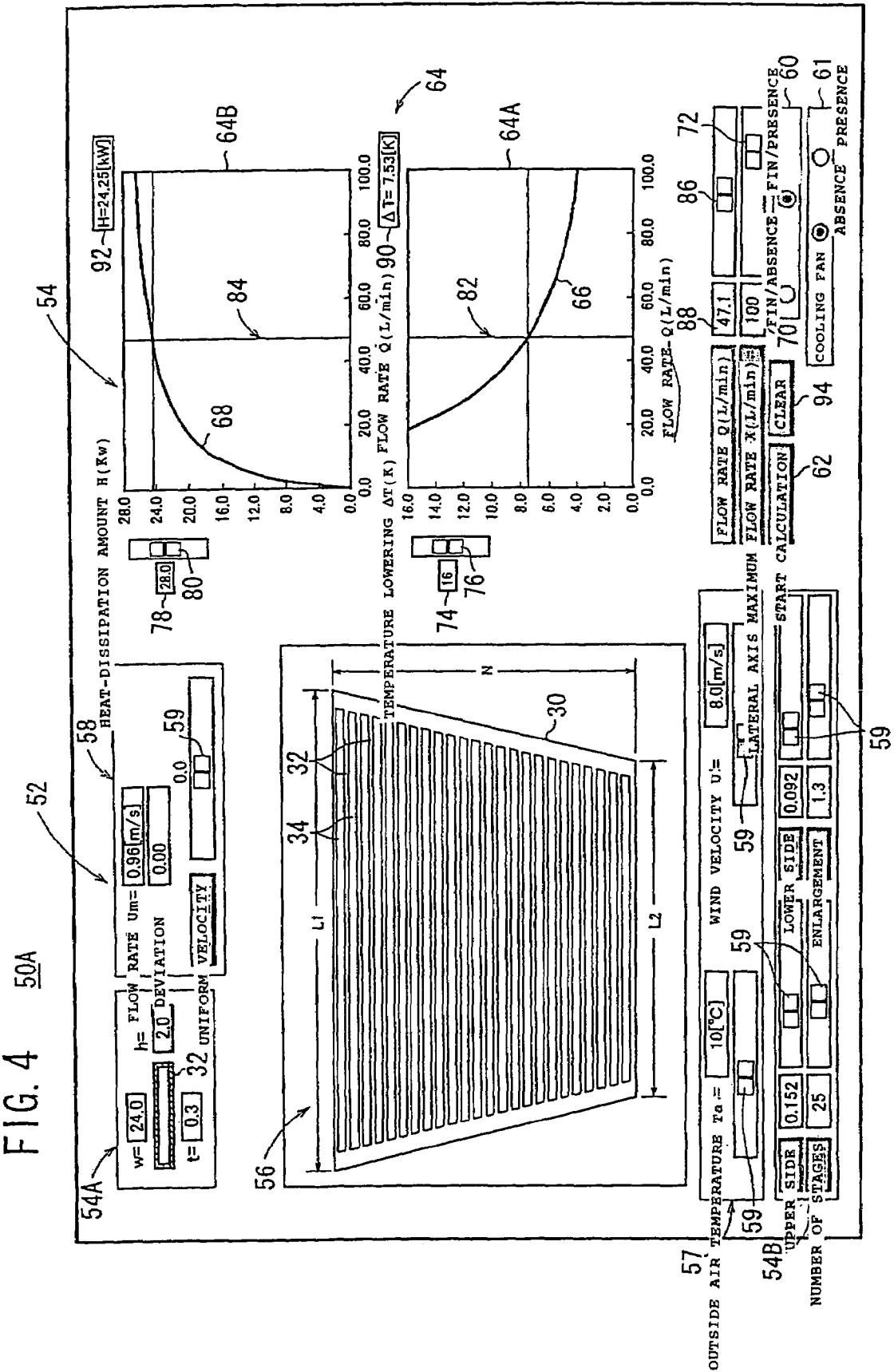
FIG. 4 is an explanatory drawing showing an input system screen and an output system screen of the display device.

FIG. 4 shows a screen 50A on which a temperature lowering characteristic 66 and a heat-dissipation amount characteristic 68 calculated by the heat-dissipation calculating unit 24 are displayed on the graph display section 64. The temperature lowering characteristic 66 displayed on the lower right side of the display 50A shows a flow rate Q (L/min) on the lateral axis and the temperature lowering $\Delta T$ (K) of cooling water between the inlet and outlet ports 40, 38 of the radiator 30 on the vertical axis.

The heat-dissipation amount characteristic 68 displayed on the upper right side of the display 50A shows the flow rate Q (L/min) on the lateral axis and a heat-dissipation amount H (kW) on the vertical axis.

In this case, the full scale is displayed on a flow rate display window 70 of the flow rate Q on the lateral axis (the full scale flow rate (maximum flow rate on the lateral axis) X=100 (L/m) for example). The full scale flow rate X can be adjusted by a slider 72.

The full scale of the temperature lowering characteristic 66 (vertical axis full scale) is 16 (K) as shown on a display window 74 for example, the value can be changed by a slider 76.

Furthermore, the full scale of the heat-dissipation characteristic 68 (vertical axis full scale) is 28.0 (kW) as shown on a display window 78 for example, however, the value can be changed by a slider 80.

Still further, red-colored cross-shaped cursors 82, 84 are provided which move along the temperature lowering characteristic 66 and the heat-dissipation amount characteristic 68 for reading the temperature lowering $\Delta T$ and the heat-dissipation amount H corresponding to a certain flow rate Q in the temperature lowering characteristic 66 and the heat-dissipation amount characteristic 68 as resulting numerical values.

By moving a slider 86 in the lateral direction, the cross-shaped cursors 82, 84 move in the same direction along the curves on a graph indicating the temperature lowering characteristic 66 and the heat-dissipation amount characteristic 68. At this time, the cross-shaped cursors 82, 84, and the flow rate Q on the lateral axis is displayed in a flow rate display window 88 as the numerical value result display section (Q=47.1 (L/min) is displayed, for example) as the value of the intersection between the temperature lowering characteristic 66 and the heat-dissipation amount characteristic 68, that is, as the resulting numerical value and, in the same manner, the temperature lowering $\Delta T$ is displayed in a temperature lowering display window 90 as the resulting numerical value display section ($\Delta T$=7.53 (K) is displayed for example). Furthermore, the heat-dissipation amount H is displayed on a heat-dissipation amount display window 92 (H=24.25 (kW) is displayed for example).

In this case, by changing the shape of the radiator 30 (the shape is entered again) by the shape data input section 54A, 54B on the input system screen 52 on the left half and pressing the calculation initiating button 62 again, the graphs of the temperature lowering characteristic 66 and the heat-dissipation amount characteristic 68 are displayed in an overlapped manner. By pressing a delete button 94, the screen 50 before displaying the graphs shown in FIG. 3 is restored.

Figure 5:
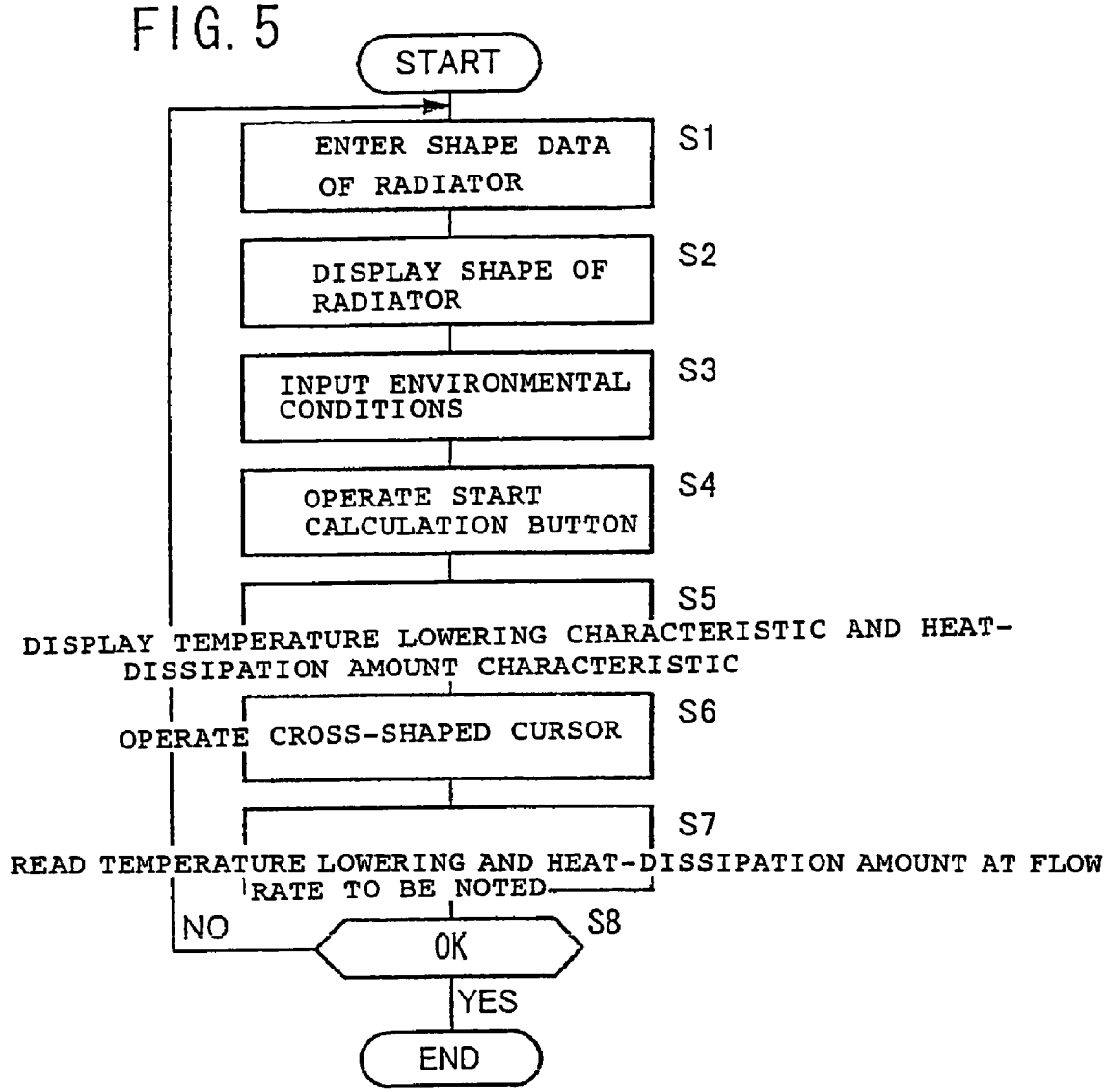
FIG. 5 is a flowchart of a simulation process according to the present embodiment.

In this manner, the embodiment described above is, when described and also referring to a flowchart shown in FIG. 5, a radiator heat-dissipation simulation system using a computer for calculating the heat-dissipation capability of the vehicle radiator 30 (in this embodiment, the heat-dissipation characteristic 68 and the temperature lowering characteristic 66) and displaying the result on the screen 50, 50A of the display device 16. The system includes shape data input sections 54A, 54B for entering the shape data of the radiator 30 (Step S1), a shape display section 56 for displaying the geometric shape of the radiator 30 calculated by the computer (the geometrical shape calculating unit 22) based on the entered shape data (Step S2), environmental conditions input section 57 for setting and entering the environmental conditions of the vehicle (Step S3), and a graph display section 64 for calculating the heat-dissipation capability of the radiator by the computer based on the entered shape data and the environmental conditions (Step S4) and displaying the calculated result as a graph and a numerical value (Step S5). The shape data input sections 54A, 54B, the shape display section 56, the environmental condition input section 57, and the graph display section 64 are displayed on the identical screen 50, 50A of the display device 16.

Since the shape data input sections 54A, 54B and the shape display section 56 relating to the radiator 30, the environmental condition input section 57 relating to the vehicle, and the graph display section 64 for displaying the calculated result as a graph are displayed on the identical screen 50, 50A of the display device 16, the pattern diagram of the radiator shape and the result of the heat-dissipation capability (characteristic) can be viewed as a graph simultaneously only by entering the shape data of the radiator 30 without switching the screen. In other words, since the change of the shape and the influence (the result of the heat-dissipation capability) are displayed on the identical screen 50, 50A visually and immediately, the relation between the shape and the heat-dissipation capability of the radiator 30 can be comprehended by intuition.

The temperature lowering $\Delta T$ and the heat-dissipation amount H, which are the results in numerical value corresponding to the specific flow rate (the flow rate to be noted) Q can be read (Step S7) by the cross-shaped cursors 82, 84 which can be moved along the graphs of the temperature lowering characteristic 66 and the heat-dissipation amount characteristic 68 by the operation of the input device 14 (Step S6). Thus, whether or not the desired result could be obtained can be confirmed easily, and if the desired result could not be obtained (Step S8), the steps from S1 to S7 described above may be repeated until the desired result can be obtained.

In this case, as will be understood from the screen 50, 50A, the input system display 52 having the shape data input sections 54A, 54B, the shape display section 56, and the environmental condition input section 57, and the graph display section 64 are displayed on the identical screen 50, 50A of the display device 16 by diving the screen into a left part and a right part. Thus, the output result can be easily comprehended. In other words, the screen is eye-friendly because the screen 50, 50A is divided into the input system and the output system.

Here, by employing the number of stages N of the cooling pipes 32 which constitute the radiator 30, the shape of the cross-section of the cooling pipes 32, and the upper and bottom sides when the contour of the radiator 30 is a trapezoidal shape as the shape data of the radiator 30, and employing the air velocity U corresponding to the vehicle velocity and the outside air temperature Ta as the environmental conditions of the vehicle, an estimation of the heat-dissipation capability is effectively enabled by changing the main data (parameters) and changing the shape.

When it is determined to be necessary to mount the cooling fan to the radiator 30 from the calculated result or the like, the presence/absence button 61 of the cooling fan is switched to the cooling fan "presence" and then the shape data of the cooling fan is entered in the process of entering the shape data of the radiator 30 in Step S1 described above.

Figure 6:
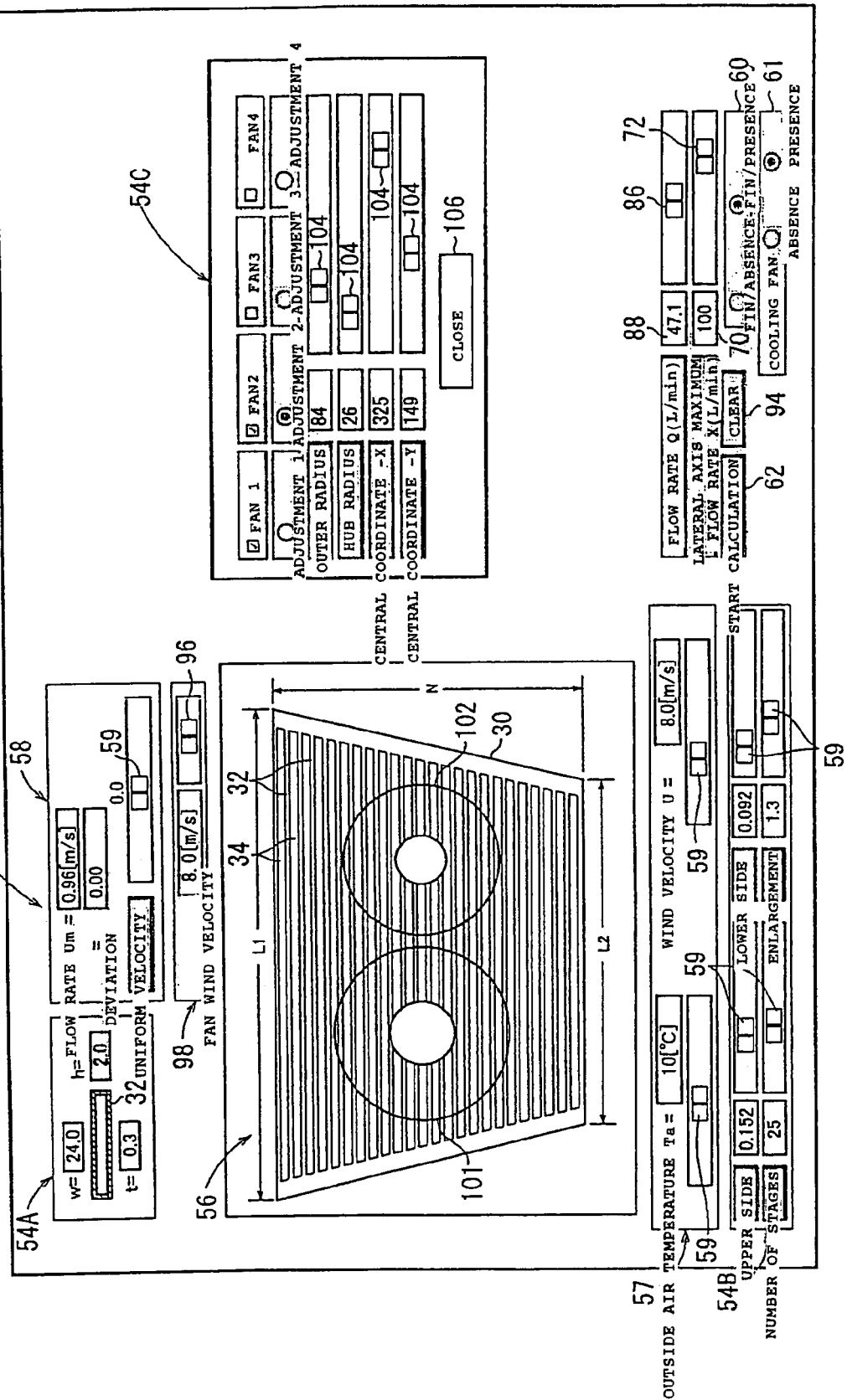
FIG. 6 is an explanatory drawing of an input screen of the display device when being switched to a cooling fan "presence".

FIG. 6 is an explanatory drawing of the input screen 50B of the display device 16 when the cooling is switched to the cooling fan "presence."

On the screen 50B, a shape data input section 54C for the cooling fan for entering and changing the size of the cooling fan, entering and changing the position of the same, and entering and changing the number of the same is displayed. In addition, a fan air velocity input section 98 for the cooling fan for changing the air velocity (displayed to be 8.0 (m/s) on the screen) of a slider 96 is displayed.

In this case, the geometrical shape of two cooling fans 101, 102 calculated by the geometrical shape calculating unit 22 in Step S2 as well as the geometrical shape of the radiator 30 including the cooling fans 101, 102 mounted thereon are displayed in the shape display section 56 on the screen 50B.

Here, it is understood from the display of the shape data input section 54C of the cooling fan that the two cooling fans 101, 102 are used, and the shape of the cooling fan 102 is being adjusted. The data of the cooling fan 102 is "84"(mm) in outer diameter, "26" (mm) in hub radius, "325"(mm) in the central coordinate X, "149" (mm) in the central coordinate Y as the parameters which can be changed by a slider 104. By pressing a "close" button 106, the display of the shape data input section 54C for the cooling fan can be cleared, while by setting the presence/absence button 61 for the cooling fan to the cooling fan "presence" again, the display appears. Actually, the shape data input section 54C of the cooling fan is displayed on the graph display section 64 in the overwritten manner.

By pressing the calculation start button 62 in this state, the heat-dissipation capability calculating section 24 calculates the preset heat-dissipation capability of the cooling fans 101, 102 (Step S4), and the new results of the calculation are displayed as the temperature lowering characteristic 66 and the heat-dissipation characteristic 68 on the graph display section 64 as in FIG. 5 (step S5).

The present invention is not limited to the above-described embodiment and, for example, the system can easily be extended in such a manner that the contour of the radiator is formed into a given shape corresponding actually to the vehicle to which the water-cooled engine or the like is mounted; not the trapezoidal shape, but the quonset or asymmetry shape based on the present invention. Thus, various configurations may be employed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A radiator heat-dissipation simulation system using a computer in which the heat-dissipation capability of a vehicle radiator is calculated and the result of the calculation is displayed on a screen of a display device, comprising:
    a shape data input section for entering the shape data of the radiator;
    a shape display section for displaying a geometric shape of the radiator calculated by the computer based on the entered shape data;
    an environmental conditions input section for setting and environmental conditions of a vehicle; and
    a graph display section for calculating the heat-dissipation capability of the radiator by computer based on the entered shape data and the environmental conditions and displaying the calculated result as a graph,
    wherein the shape data input section, the shape display section, the environmental condition input section, and the graph display section are displayed permanently and simultaneously in predetermined fixed positions that are separated relative to each other on a single screen of the display device, and
    wherein a change of the shape data and a change of the environmental conditions are immediately and visually reflected simultaneously in both a change of the geometric shape of the radiator displayed on the shape display section of the single screen and a change of the heat-dissipation capability of the radiator displayed on the graph display section; and
    wherein an input-system screen including the shape data input section, the shape display section, and the environmental conditions input section can be permanently and simultaneously displayed in the predetermined fixed positions on the single screen of the display device together with the graph display section by being divided into non-overlapping left and right sides of the single screen,
    wherein the shape data input section, the shape display section, and the environmental conditions input section are disposed on one of the left and right sides, and the graph display section is disposed on the other of the left and right sides of the single screen,
    wherein at least one slider is permanently and simultaneously displayed at another predetermined fixed position between the shape display section and the graph display section, the at least one slider enabling a user of the system to change a temperature lowering characteristic or a heat-dissipation characteristic of the radiator.

2. The radiator heat-dissipation simulation system according to claim 1, wherein the radiator shape data includes the number of stages of cooling pipes constituting the radiator, a shape of the cross-section of the cooling pipes, and an upper side and a lower side of the radiator when the radiator contour is assumed to have a trapezoidal shape, and the vehicle environmental conditions include air velocity and outside air temperature corresponding to the velocity of the vehicle.

3. The radiator heat-dissipation simulation system according to claim 1, wherein the shape data of a cooling fan of the radiator is entered via the shape data input section, and the geometrical shape of the cooling fan is displayed on the shape display section, the shape data input section being disposed directly above the shape display section on one of a left or a right side of the single screen.

4. The radiator heat-dissipation simulation system according to claim 1, wherein the computer includes an input processing unit for converting parameters of the radiator from the shape data input section into the shape data and outputting the shape data to a geometrical shape calculating unit, the geometrical shape calculating unit for calculating the geometrical shape of the radiator based on the shape data, a heat-dissipation capability calculating unit for calculating the heat-dissipation capability of the radiator based on the environmental conditions and a display processing unit for generating video signals for displaying on a screen based on the shape data and the environmental conditions and a result of calculation obtained by the geometrical shape calculating unit and the heat-dissipation capability calculating unit.

5. The radiator heat-dissipation simulation system according to claim 4, wherein the heat-dissipation calculating unit includes an algorithm $$dT/dx = -(T-Ta)K/u - (T^4 - Ta^4)M/u$$

for calculating the heat-dissipation capability,
    wherein x represents given positions of cooling pipes in a longitudinal direction, T(x) represents water temperature, and Ta represents an outside air temperature, u represents the flow rate of water, K represents a constant value which contributes to a heat transfer from water to the outer walls of the cooling pipes and M represents a constant value which contributes to heat radiation from the outer walls of the cooling pipes determined by a shape of the cooling pipes and Stefan-Boltzmann's constant.

6. The radiator heat-dissipation simulation system according to claim 1, wherein the single screen includes an input system screen and an output system screen, the input system screen includes the shape data input section for entering the shape data of the radiator via an input device and processed by an input processing unit, the shape display section for displaying the geometrical shape of the radiator calculated by a geometrical shape calculating unit based on the entered shape data, the environmental conditions input section for setting the environmental conditions of the vehicle entered via the input device and processed by the input processing unit, and a flow velocity input section for setting a flow rate of a flow flowing in respective cooling pipes and distribution of the flow rate.

7. The radiator heat-dissipation simulation system according to claim 6, wherein the shape data input section receives width, height and thickness of cross-sectional shape of the cooling pipes.

8. The radiator heat-dissipation simulation system according to claim 6, wherein the environmental conditions input section receives outside air temperature and air speed corresponding to vehicle speed data.

9. The radiator heat-dissipation simulation system according to claim 6, wherein the flow velocity input section receives flow velocity distribution data based on at least one of fin-presence and fin-absence.

10. A radiator heat-dissipation simulation method using a computer in which the heat-dissipation capability of a vehicle radiator is calculated and the result of calculation is displayed on a screen of a display device, comprising the following steps:

entering shape data of the radiator;

displaying a geometric shape of the radiator calculated by the computer based on the entered shape data;

setting and entering environmental conditions of a vehicle;

calculating the heat-dissipation capability of the radiator by computer based on the entered shape data and the environmental conditions and displaying the calculated result as a graph; and permanently and simultaneously displaying a shape data input section, a shape display section, an environmental conditions input section, and a graph display section in predetermined fixed positions that are separated relative to each other on a single screen of the display device, and wherein a change of the shape data and a change of the environmental conditions are immediately and visually reflected simultaneously in both a change of the geometric shape of the radiator displayed on the shape display section of the single screen and a change of the heat-dissipation capability of the radiator displayed on the graph display section of the single screen; and wherein the step of permanently and simultaneously displaying on the display device of a shape data input section, a shape display section, and the environmental conditions input section is displayed in the predetermined fixed positions on the single screen of the display device together with a graph display section by being divided into non-overlapping left and right sides of the single screen, wherein the shape data input section, the shape display section, and the environmental conditions input section are disposed on one of the left and right sides, and the graph display section is disposed on the other of the left and right sides of the single screen, wherein at least one slider is permanently and simultaneously displayed at another predetermined fixed position between the shape display section and the graph display section, the at least one slider enabling a user of the system to change a temperature lowering characteristic or a heat-dissipation characteristic of the radiator.

11. The radiator heat-dissipation simulation method according to claim 10, wherein the radiator shape data includes the number of stages of cooling pipes constituting the radiator, a shape of the cross-section of the cooling pipes, and an upper side and a lower side of the radiator when the radiator contour is assumed to have a trapezoidal shape, and the vehicle environmental conditions include air velocity and outside air temperature corresponding to the velocity of the vehicle.

12. The radiator heat-dissipation simulation method according to claim 10, wherein the shape data of a cooling fan of the radiator is entered via the shape data input section, and the geometrical shape of the cooling fan is displayed on the shape display section, the shape data input section being disposed directly above the shape display section on one of a left or a right side of the single screen.

13. The radiator heat-dissipation simulation method according to claim 10, wherein the computer includes an input processing unit for converting parameters of the radiator from the shape data input section into the shape data and outputting the shape data to a geometrical shape calculating unit, the geometrical shape calculating unit for calculating the geometrical shape of the radiator based on the shape data, a heat-dissipation capability calculating unit for calculating the heat-dissipation capability of the radiator based on the environmental conditions and a display processing unit for generating video signals for displaying on a screen based on the shape data and the environmental conditions and a result of calculation obtained by the geometrical shape calculating unit and the heat-dissipation capability calculating unit.

14. The radiator heat-dissipation simulation system according to claim 13, wherein the heat-dissipation calculating unit includes an algorithm $$dT/dx = -(T-Ta)K/u - (T^4 - Ta^4)M/u$$

for calculating the heat-dissipation capability, wherein x represents given positions of cooling pipes in a longitudinal direction, $T(x)$ represents water temperature, and Ta represents an outside air temperature, u represents the flow rate of water, K represents a constant value which contributes to a heat transfer from water to the outer walls of the cooling pipes and M represents a constant value which contributes to heat radiation from the outer walls of the cooling pipes determined by a shape of the cooling pipes and Stefan-Boltzmann's constant.

15. The radiator heat-dissipation simulation system according to claim 10, wherein the single screen includes an input system screen and an output system screen, the input system screen includes the shape data input section for entering the shape data of the radiator via an input device and processed by an input processing unit, the shape display section for displaying the geometrical shape of the radiator calculated by a geometrical shape calculating unit based on the entered shape data, the environmental conditions input section for setting the environmental conditions of the vehicle entered via the input device and processed by the input processing unit, and a flow velocity input section for setting a flow rate of a flow flowing in respective cooling pipes and distribution of the flow rate.

16. The radiator heat-dissipation simulation system according to claim 15, wherein the shape data input section receives width, height and thickness of cross-sectional shape of the cooling pipes.

17. The radiator heat-dissipation simulation method according to claim 15, wherein the environmental conditions input section receives outside air temperature and air speed corresponding to vehicle speed data.

18. The radiator heat-dissipation simulation method according to claim 15, wherein the flow velocity input section receives flow velocity distribution data based on at least one of fin-presence and fin-absence.

* * * * *